(No Model.)  10 Sheets—Sheet 1.
R. STEEGMÜLLER.
CAN SEAMING MACHINE.
No. 440,411.  Patented Nov. 11, 1890.
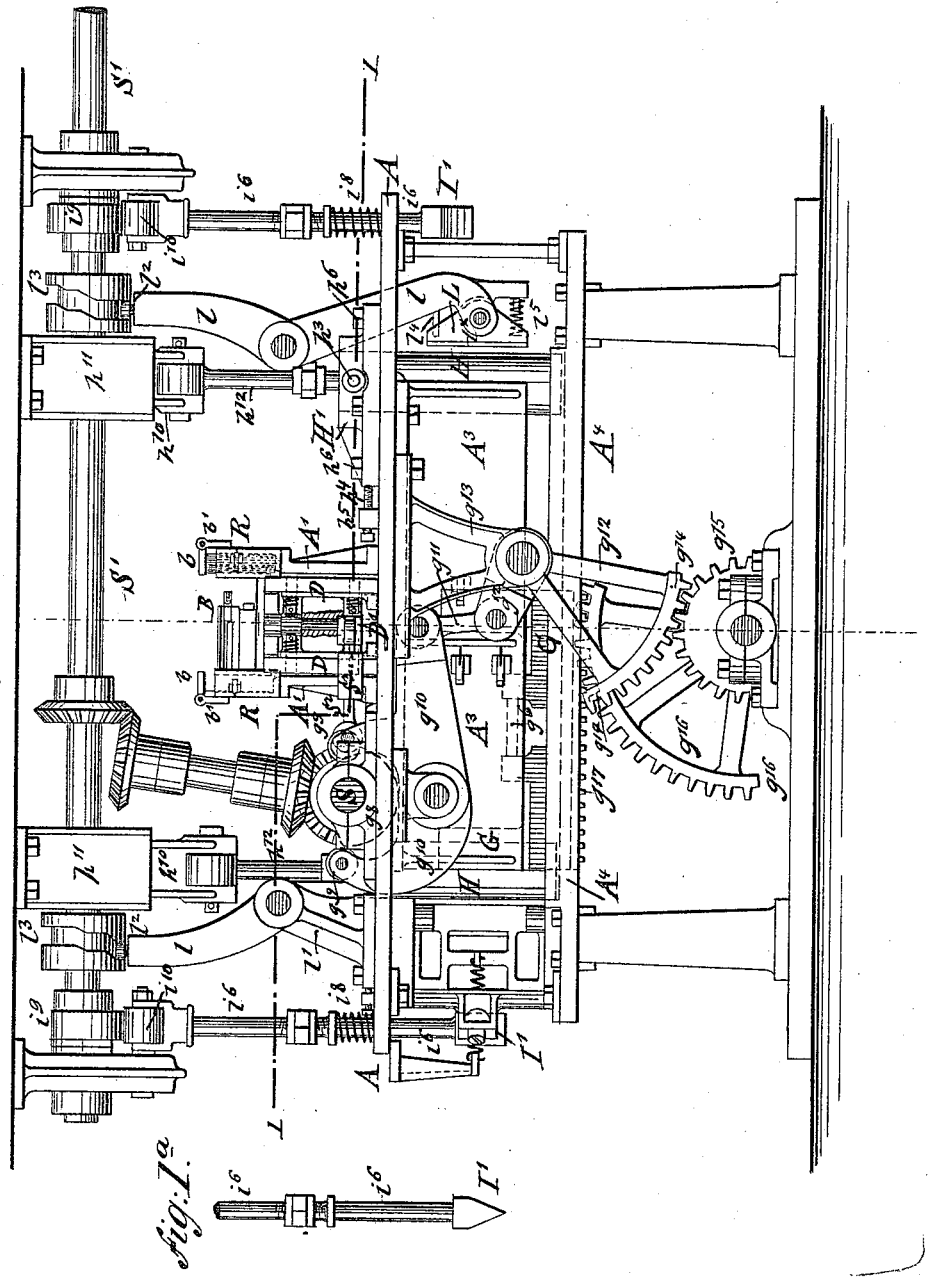
WITNESSES:
INVENTOR
ATTORNEYS.

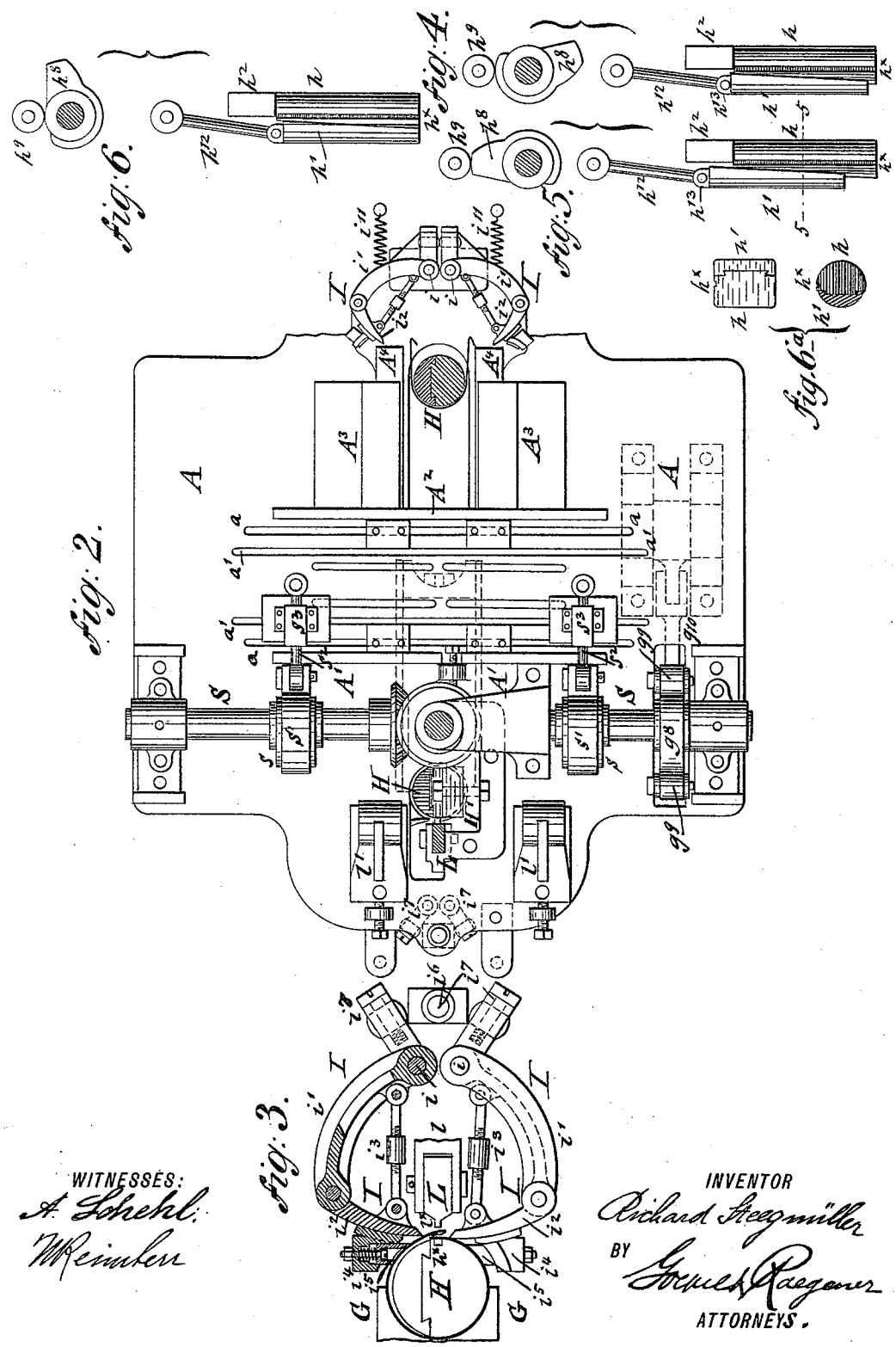

(No Model.) 10 Sheets—Sheet 3.
R. STEEGMÜLLER.
CAN SEAMING MACHINE.
No. 440,411. Patented Nov. 11, 1890.
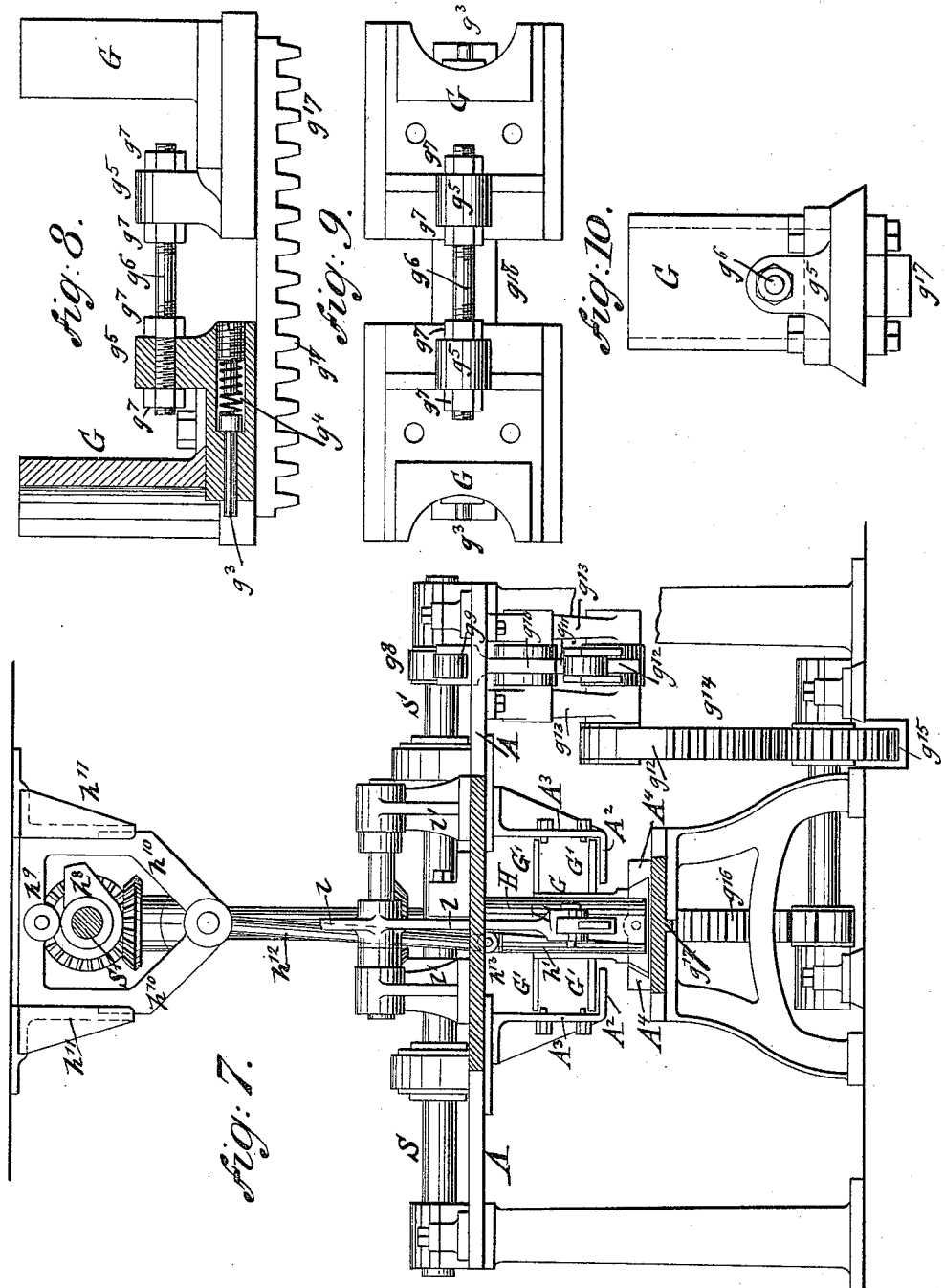
WITNESSES: A. Schehl.
INVENTOR Richard Steegmüller
BY Gorpus & Regener
ATTORNEYS.

(No Model.) 10 Sheets—Sheet 4.
R. STEEGMÜLLER.
CAN SEAMING MACHINE.
No. 440,411. Patented Nov. 11, 1890.
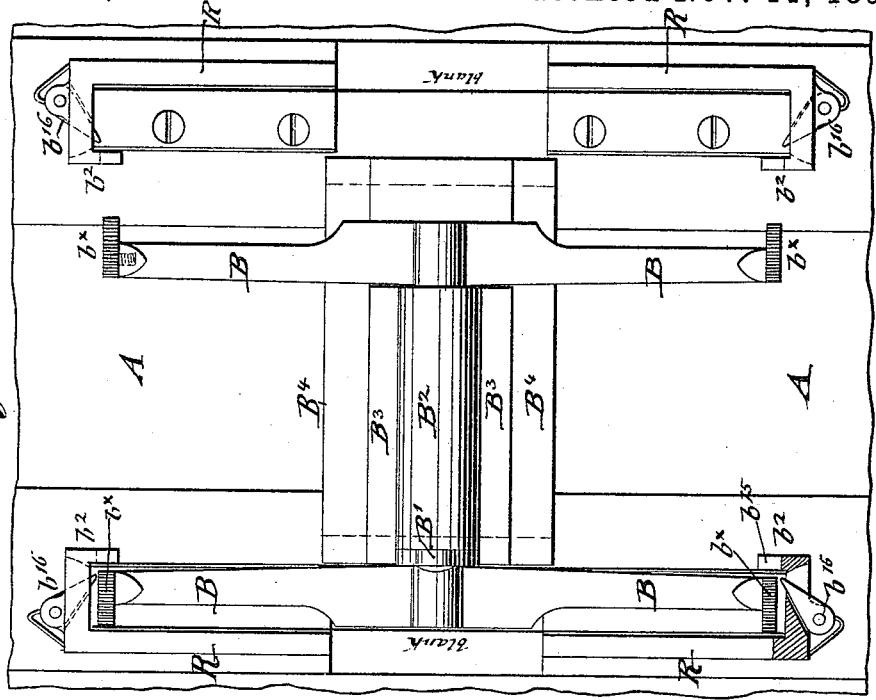
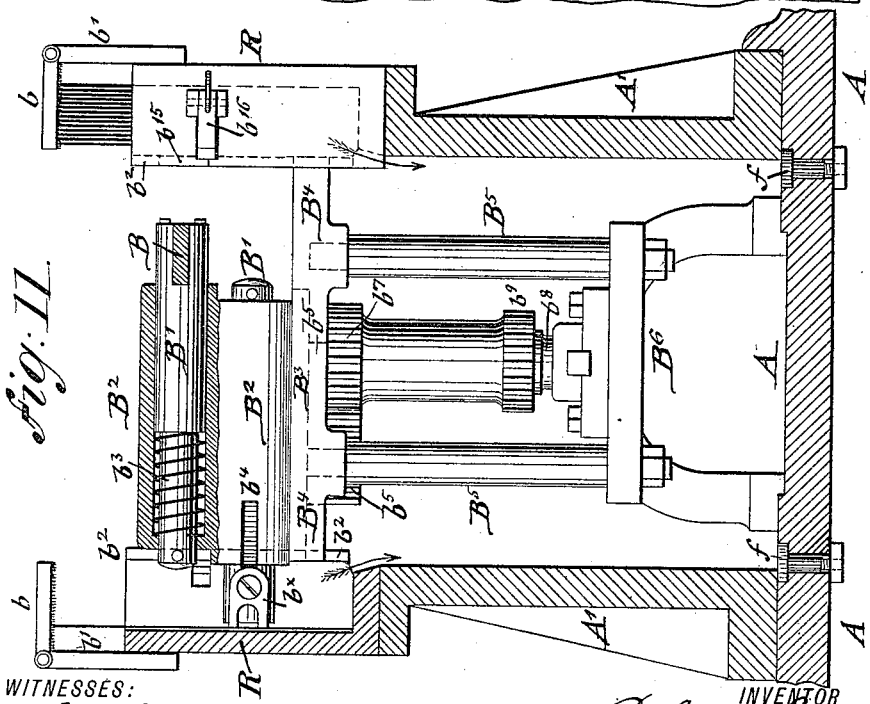
WITNESSES:
A. Schehl.
W. Reinherr
INVENTOR
Richard Steegmüller
BY
Grebel & Raegener
ATTORNEYS.

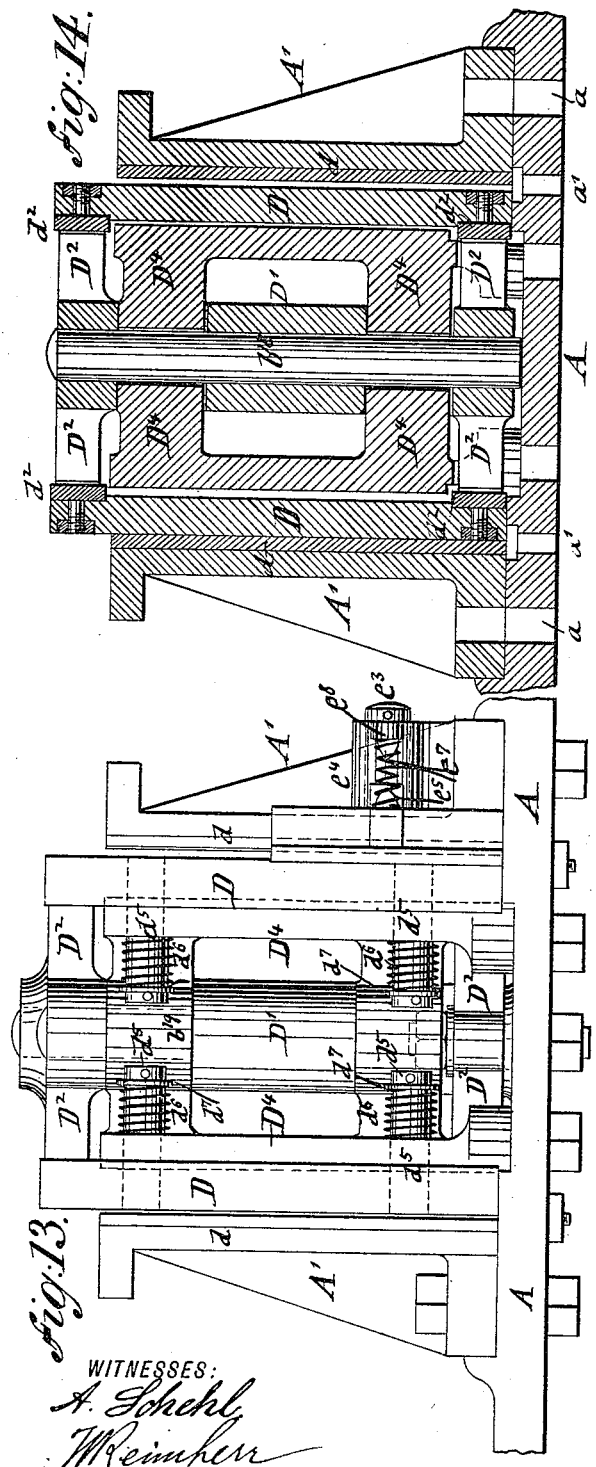
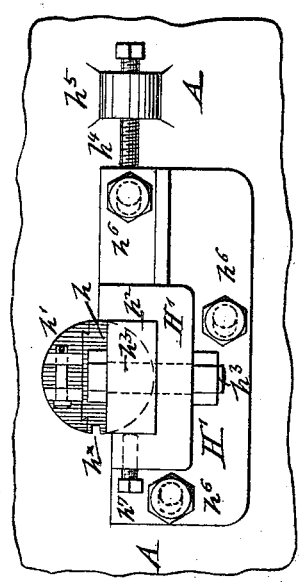
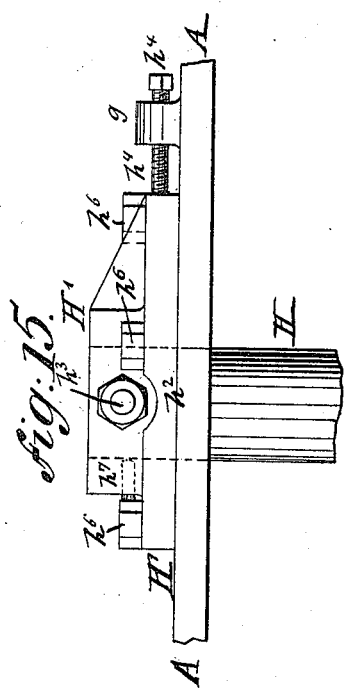

(No Model.) R. STEEGMÜLLER. 10 Sheets—Sheet 6.
CAN SEAMING MACHINE.
No. 440,411. Patented Nov. 11, 1890.
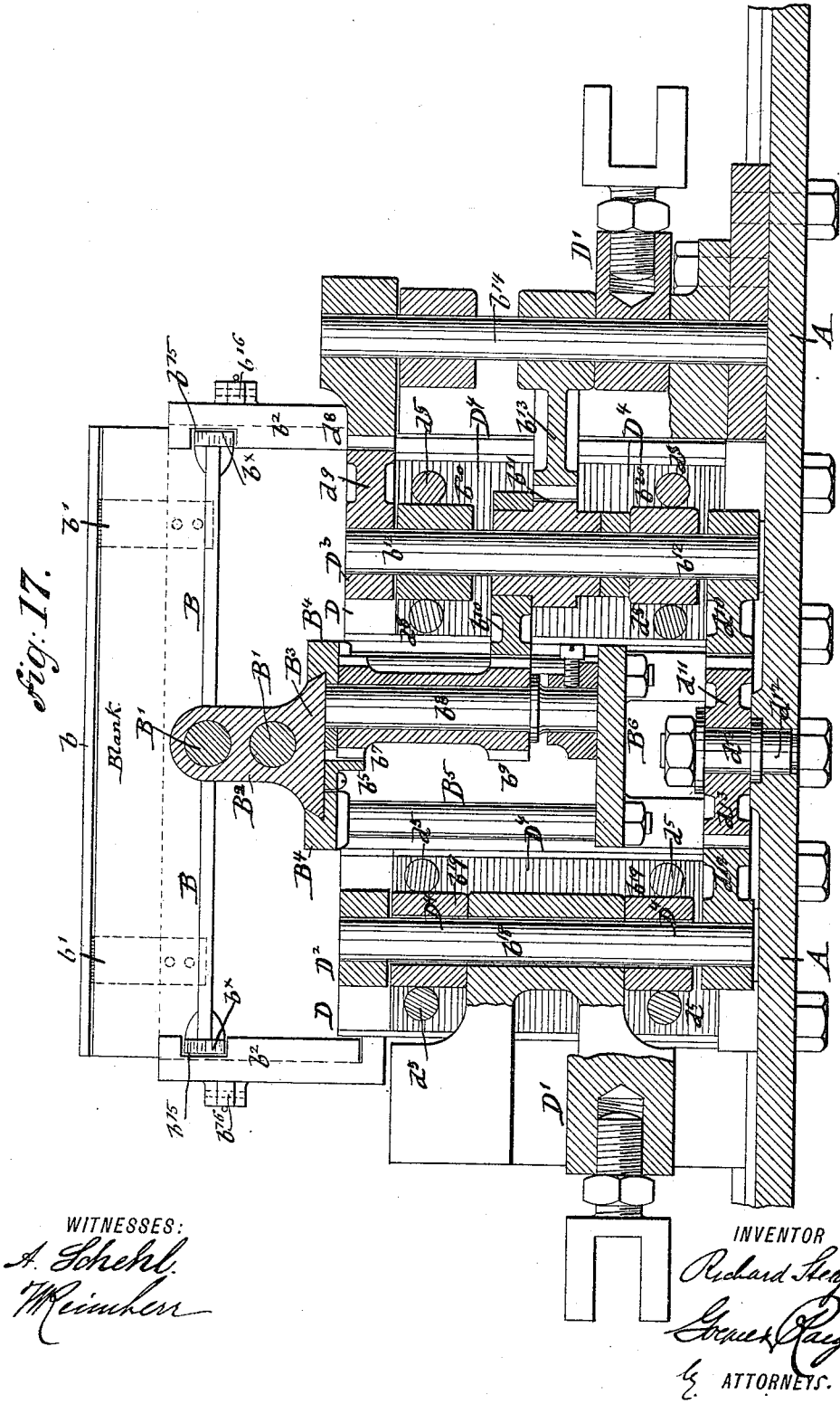
WITNESSES:
INVENTOR
ATTORNEYS.

(No Model.)
R. STEEGMÜLLER.
CAN SEAMING MACHINE.
No. 440,411.
10 Sheets—Sheet 7.
Patented Nov. 11, 1890.
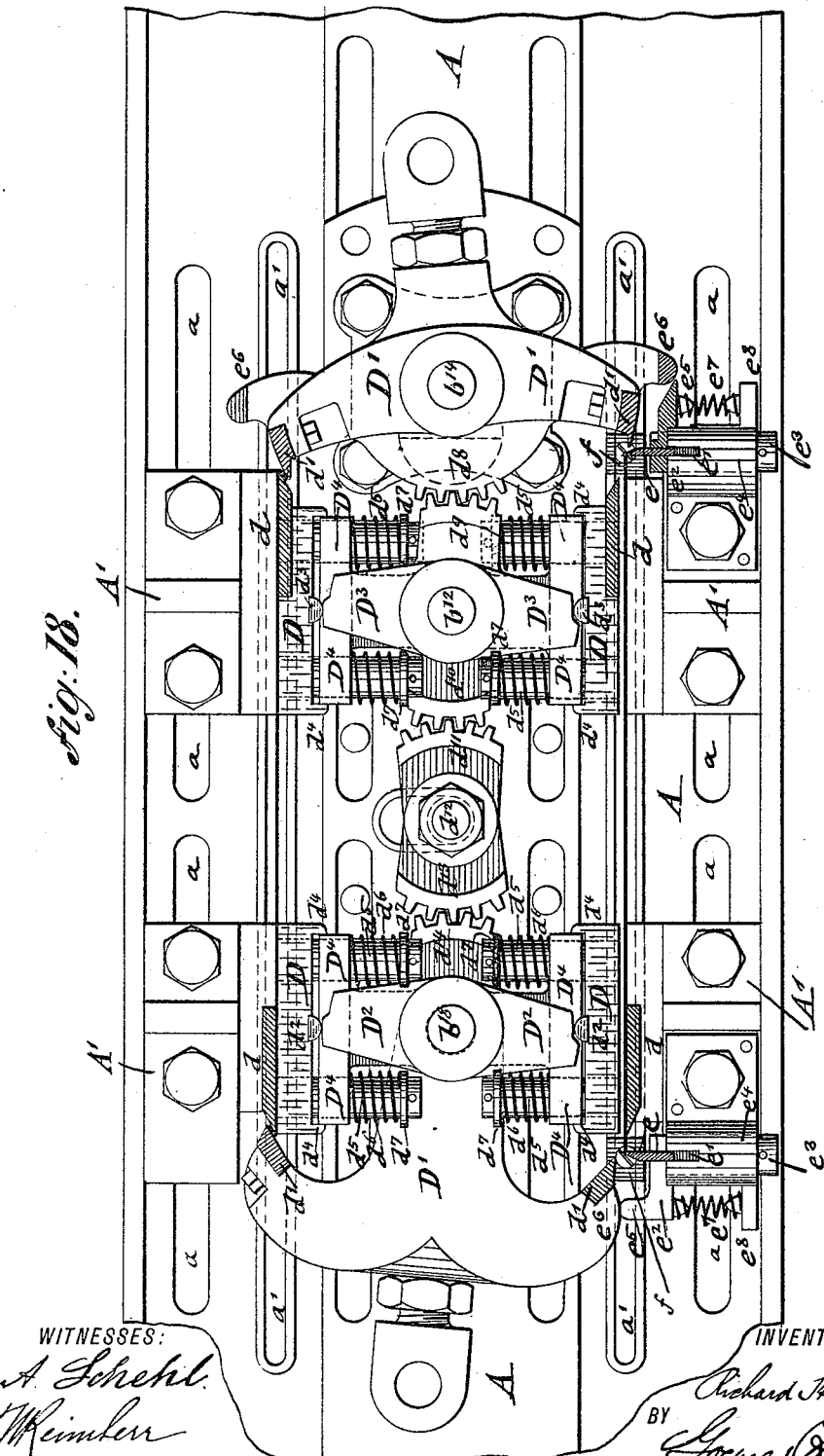
WITNESSES:
A. Schehl
W. Kimberr
INVENTOR
Richard Steegmüller
BY
Goepel & Raegener
ATTORNEYS.

(No Model.) 10 Sheets—Sheet 8.
R. STEEGMÜLLER.
CAN SEAMING MACHINE.
No. 440,411. Patented Nov. 11, 1890.
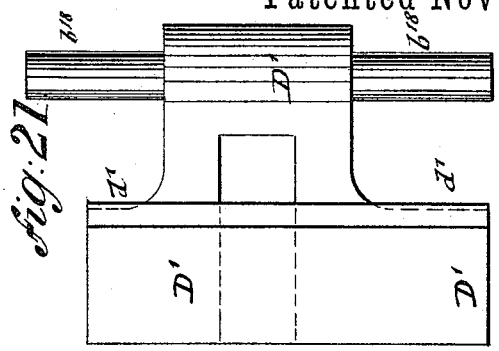
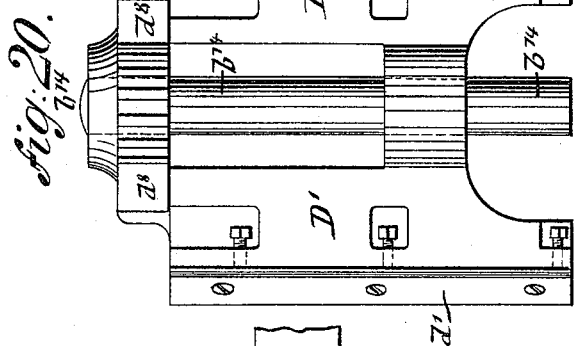
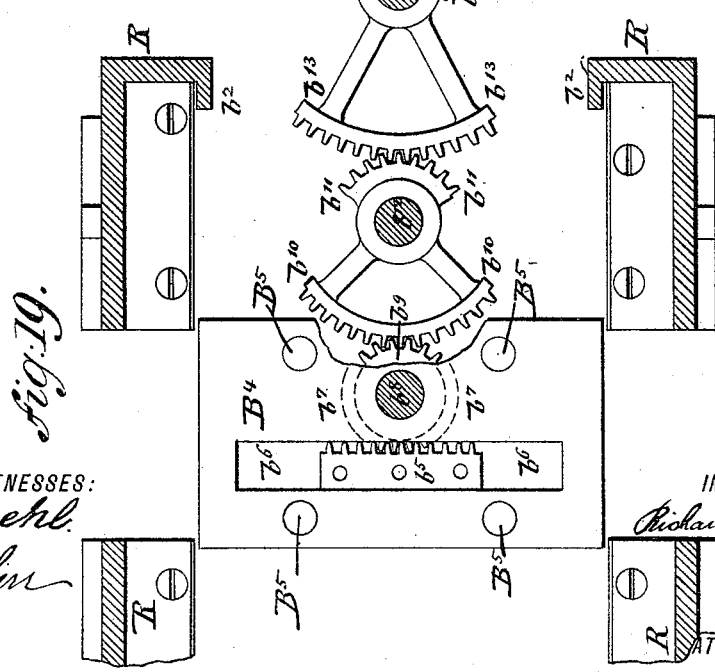
WITNESSES:
A. Schehl.
W. Reinher
INVENTOR
Richard Steegmüller
Hoepke Raegener
ATTORNEYS.

(No Model.)
R. STEEGMÜLLER.
CAN SEAMING MACHINE.
No. 440,411. Patented Nov. 11, 1890.
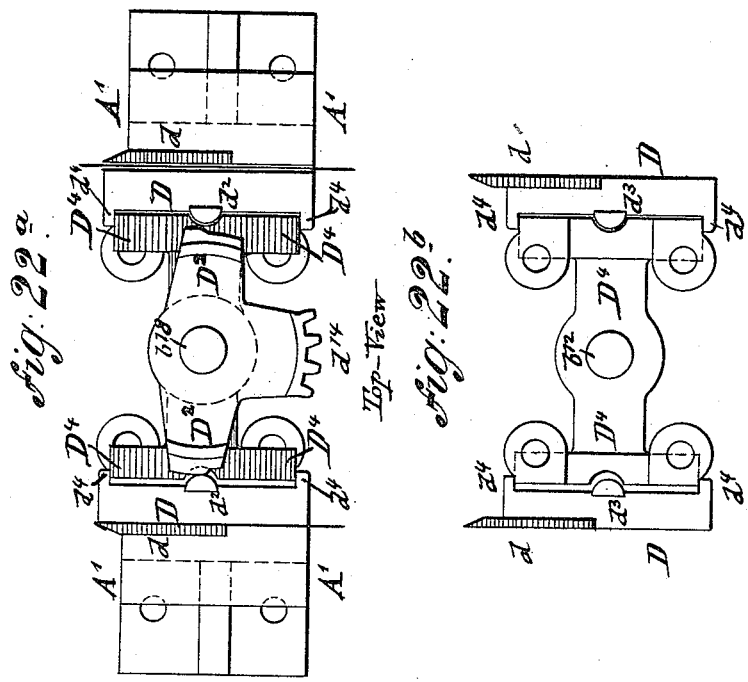
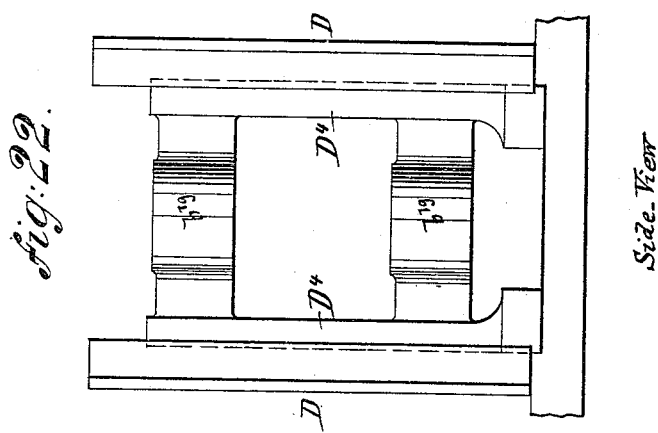
WITNESSES:
INVENTOR
ATTORNEYS.

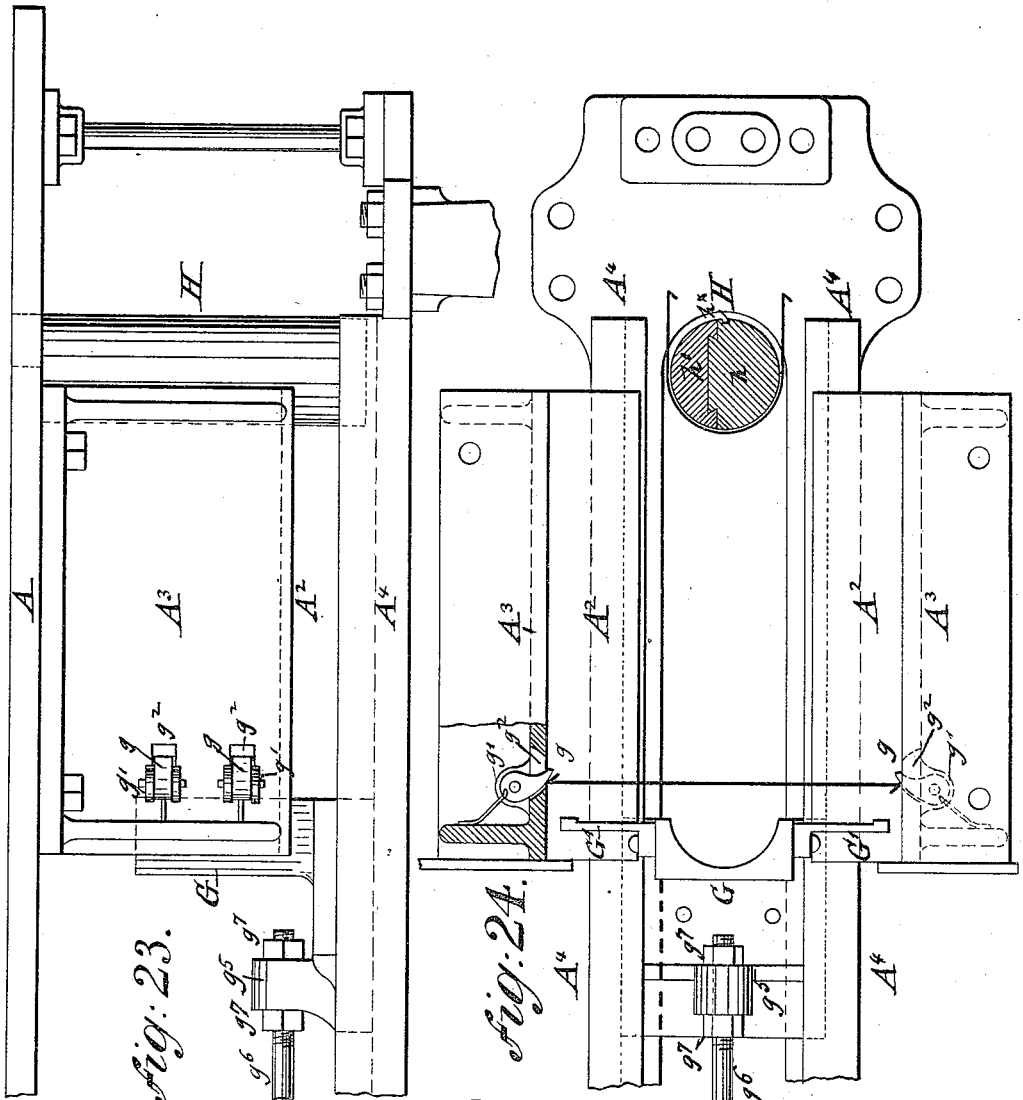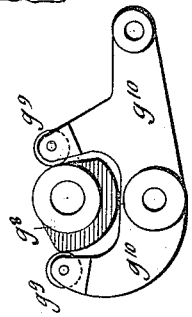

UNITED STATES PATENT OFFICE.

RICHARD STEEGMÜLLER, OF NEW YORK, N. Y.

CAN-SEAMING MACHINE.

SPECIFICATION forming part of Letters Patent No. 440,411, dated November 11, 1890.

Application filed February 3, 1890. Serial No. 339,111. (No model.)

*To all whom it may concern:*

Be it known that I, RICHARD STEEGMÜLLER, of the city, county, and State of New York, a citizen of the United States, have invented certain new and useful Improvements in Machines for Making the Seams of Sheet-Metal Cans, of which the following is a specification.

This invention relates to an improved machine for making the seams of sheet-metal cans or boxes and forming the bodies of said cans or boxes from the blanks at one continuous operation; and the invention consists of certain novel combinations of parts, whereby the blank is fed automatically by the feeding devices from the blank-receiver to the edge-folding devices, folded at the edges, and then dropped from the same into the path of a horizontally-reciprocating former, which places it around a vertical horn on which the folded ends of the blank are interlocked and closed, so as to form the longitudinal seam of the can-body and from which the can-body is dropped by gravity, all the operations being performed by the successive actions of the different parts of the machine, so that the seaming of the can or box-body is performed in a more reliable, economical, and effective manner than with the machines heretofore in use.

In the accompanying drawings, Figure 1 represents a side elevation of my improved machine for making the seams of sheet-metal cans. Fig 1ª is a detail end view of the spreading wedge by which the blank-closing jaws are operated. Fig. 2 is a plan of the machine, partly in horizontal section, on the line 1 1, Fig. 1. Fig. 3 is a plan, partly in horizontal section, of the blank forming and closing devices, the same being drawn on a larger scale. Figs. 4, 5, and 6 are side elevations of the horn on which the body of the can is formed, said figures also showing the horn in different positions, respectively, for placing the blank around the same, for permitting the closing of the blank by drawing the folded edges together, and for closing the same. Fig. 6ª shows an end view of a rectangular horn and a section of the horn on line 5 5, Fig. 5. Fig. 7 is an end elevation of the machine, partly in section; and Figs. 8, 9, and 10 are respectively a sectional side elevation, a plan, and an end elevation of the reciprocating formers for bending the blank around the horn. Figs. 11 and 12 are a vertical transverse section and a plan of the automatic feeding device for the blanks, said figures being drawn on a larger scale. Figs. 13 and 14 are a side elevation and a vertical transverse section of the mechanism by which the edges of the blank are folded or bent up in opposite direction to each other. Figs. 15 and 16 are respectively a detail side view and a plan of the adjustable bearings or shoe in which the upper end of the horn is supported. Figs. 17 and 18 represent a vertical longitudinal section and a sectional plan of the device for folding the edges of the blank, Fig. 17 also showing the mechanism by which the blank-feeding device receives its motion, both figures being drawn on a larger scale. Fig. 19 is a detail horizontal section with parts broken away, showing the motion-transmitting mechanism by which the blank-feeding device is operated. Figs. 20 and 21 are detail end views of the oscillating edge-folding blocks, one showing the block at one end and the other at the opposite end of the machine. Figs. 22, 22ª, and 22ᵇ are details of the transverse T-brace of the edge-folding device. Figs. 23 and 24 are respectively a side elevation and a sectional plan of the device for feeding the edge-folded blank to the can-forming horn, said figures being also drawn on a larger scale; and Fig. 25 is a detail view of the cam and lever by which reciprocating motion is imparted to the formers by which the edge-folded blank is moved toward the horns.

Similar letters of reference indicate corresponding parts.

My improved machine for making the seams of sheet-metal cans or boxes is constructed in the nature of a double machine, in which the parts are arranged symmetrically to the vertical transverse center plane of the machine and in such a manner that with each rotation of the driving-shaft two can-bodies are formed. For this purpose the blank-receivers, the blank-feeding devices, and the edge-folding devices are arranged parallel to said vertical transverse center plane of the machine, while the formers by which the edge-folded blanks are transferred to the forming-horns are located in line with and reciprocated in the direction of the longitudinal axis of the machine. The horns are supported vertically in line with the formers, one horn being located at each end of the machine and operated in connection with the jaws by which the blank is drawn around the horns and a nipping-hammer for closing the seam formed by the folded interlocking edges of the same. The movements of some of the operating parts are imparted from a transverse cam-shaft which is supported in journal-bearings of the supporting main plate of the machine, while the other parts receive their motions from a second overhead shaft which is supported parallel to the longitudinal axis of the machine above the first cam-shaft.

The successive operations which are performed by my improved machine take place in the following order: first, feeding the blank from the blank-receivers to the edge-folding devices; secondly, folding the edges of the blank after the same has been received; thirdly, forming the blank around a vertical horn; fourthly, drawing the folded edges of the blank together so as to cause the interlocking of the same; fifthly, closing the interlocking edges so as to form the seam by the joint action of the horn and a nipping-hammer, and, lastly, dropping the can-body from the horn so as to be conveyed off by suitable means.

The essential characteristics of my machine are, first, the arrangement of the same as a double machine, so that two complete can-bodies can be formed at each rotation of the driving-shaft; secondly, the arrangement of the blank-feeding, edge-folding, blank-shaping and seam-closing devices in such a manner that they operate on the blank while it is in a vertical position, whereby advantage can be taken of the weight of the blank and the same transferred by gravity from the feeding devices to the edge-folding devices and from the latter to the body-forming device and by which the can-body is finally dropped from the horn when completed. These features distinguish my improved machine readily from other machines heretofore devised for the same purpose.

*The blank-feeding devices.*—The blank-feeding devices are represented in detail in Figs. 11, 12, 17, and 19, and are shown in their relative position to the other parts of the machine in Fig. 1. They consist of two blank-receivers R, which are closed at three sides and open at their inner sides, which latter face each other. These receivers are supported on ribbed standards A', which are attached to the supporting main plate A of the machine. The sheet-metal blanks from which the can-bodies are to be formed are placed in upright positions into the receivers R, and are retained at their upper ends by plates $b$, which are hinged to upright supporting-arms $b'$, attached to the receivers R, said plates $b$ being provided at their under side with a felt or other suitable frictional covering, so as to bind with a uniform degree of friction on the upper edges of the blanks inserted in the receivers R, as shown in Fig. 11. Each receiver R is formed of two L-shaped sections which are supported on the standards A', of which four are arranged—one for each section of the receivers. The shape of the sections is clearly shown in Fig. 12. The inwardly-projecting flanges $b^2$ at the inner ends of the receivers R serve as abutments for the blanks and guide them along the inner edges of the bottoms of the receivers by gravity in downward direction to the edge-folding devices which are located below the blank-feeding devices. The downward motion of the blanks along the guide-flanges of the receivers and along the beveled inner edges of the bottoms of the same is indicated by arrows in Fig. 11. The blanks are alternately fed from the receivers R to the edge-folding devices by means of two horizontal reciprocating feed-arms B, which are provided at their outer ends with permanent magnets $b^x$, that are magnetized sufficiently to attract one of the blanks to their pole-faces and cause it to follow the reciprocating motion of the arms until the blank abuts against the inner flanges $b^2$ of the receiver-sections, so as to be released from said magnets and dropped by gravity, as before described. The horizontal feed-arms B are attached to shanks B', which are guided one above the other in tubular bearings $B^2$, which are supported on an enlarged base $B^3$. This base is guided in dovetailed ways of a horizontal plate $B^4$, which is attached permanently to upright posts $B^5$, that are supported on a bracket-plate $B^6$, which is again supported by brackets on the main plate A of the machine, as shown clearly in Fig. 11. On the shanks B' of the horizontal feed-arms B are arranged spiral cushioning-springs $b^3$, that are interposed between the rear ends of the tubular bearings $B^2$ and a shoulder on said shanks, said springs permitting the receding of the horizontal feed-arms B when the receivers are filled with blanks, for which purpose the bearings $B^2$ are provided with side recesses $b^4$. The springs $b^3$ produce the gradual forward feeding of the horizontal arms B, so as to cause the magnets $b^x$ to engage successively every blank in the receivers without difficulty. To the under side of the base $B^3$ of the bearings $B^2$ is attached a rack $b^5$, which is located in a slot $b^6$ of the horizontal plate $B^4$, and which meshes with a pinion $b^7$ at the upper end of a vertical shaft $b^8$, which carries at its lower part a second pinion $b^9$, that meshes with a toothed oscillating segment $b^{10}$, which is operated by a smaller segment $b^{11}$, keyed to the same shaft $b^{12}$. The segment $b^{11}$ meshes with a segment $b^{13}$ on a vertical shaft $b^{14}$, as shown clearly in Figs. 17 and 19. The shaft $b^{14}$ passes through the hub of one of the oscillating edge folding blocks and is keyed to the same, the oscillating motion of the block being transmitted by the intermediate gearing $b^{13}$ $b^{11}$ $b^{10}$ $b^9$ $b^7$, described to the rack $b^5$ and the supporting-bearings $B^3$, so that the latter are reciprocated in the ways of the supporting-plate $B^4$, whereby the horizontal feed-arms B are alternately moved into the receiver R at one side of the feeding device and then into the receiver at the other side of the same, so as to first remove by the magnets of the feed-arms B a blank from one receiver, then from the other receiver, and cause them to be dropped down alternately to the folding devices at the opposite sides of the edge-folding mechanisms. When the blank is attracted by the magnets $b^×$ at the ends of one of the horizontal feed-arms B, it is moved with the magnets to the inwardly-projecting flanges $b^2$ of the receiver R until the ends of the blank abut against said flanges. The flanges $b^2$ are provided with recesses $b^{15}$, which are arranged in line with the magnets $b^×$, so as to permit them to pass through said recesses to the interior of the receivers, as shown in Figs. 12 and 17, and take up thereby one blank after the other. By the return motion of the magnets the ends of the blank abut against the flanges $b^2$ of the receiver and are engaged by spring-dogs $b^{16}$, which are pivoted to ears arranged at the outside of the receivers and which oscillate in recesses of said boxes, said dogs serving to prevent the blank from tilting toward the rear wall of the receiver, and also to hold the blank in vertical position for dropping along the flanges $b^2$ and the beveled bottom edges of the receiver to the edge-folding device arranged below the feeding devices. The spring-dogs $b^{16}$ are clearly shown in Fig. 12, in which figure one blank is shown in each receiver, and in which the blank on the left-hand receiver is shown in the act of being attracted by the magnets of one of the horizontal feed-arms, while at the same time the magnets of the other feed-arms are outside of the receiver at the right-hand side. When the blank is moved forward in the receiver by the magnets, the ends of the blank press the inner ends of the spring-dogs out of the way, so that the blank can pass beyond the same. As soon as the blank has passed the spring-dogs the latter are forced again into the position shown in Fig. 12, ready to re-engage the blank and hold it in proper position for being dropped along the flanges of the receivers to the edge-folding devices arranged below the receivers.

*The edge-folding devices*—The edge-folding devices are shown in Fig. 1, and on a larger scale in Figs. 13, 14, 17, 20, and 21. The ribbed angular standards A' form parts of the edge-folding devices as they serve for supporting the blanks which are fed from the receivers. The angular standards A' are made adjustable on the main plate A, which latter is arranged with transverse slots $a$, through which the shanks of the clamping-screws are passed, by which the standards A' are attached to the main plate A. The adjustability of the standards is necessary for the purpose of providing for different lengths of blanks according to the different sizes of can-bodies required. Simultaneously with adjusting the standards A' the receiver-sections are also adjusted to the required length of blanks. In folding the edges of the blanks it is necessary to fold them in opposite directions. This is accomplished by means of fixed and oscillating folding plates or dies $d$ $d'$. One set of fixed folding-plates $d$ is permanently attached to the standards A', so as to fold one end of the blanks, while a second set of folding-plates $d$ for folding the opposite ends of the blanks is attached to laterally-movable blocks D, which are alternately pressed against the faces of the adjoining standards A', as shown in Figs 18 and $22^a$. The oscillating plates $d'$ are applied to the ends of T-shaped pushers D', of which one is fulcrumed to the shaft $b^{14}$, so as to oscillate on the same, while the hub of the other pusher D' is loosely pivoted to an upright shaft $b^{18}$, which is supported in suitable bearings $b^{19}$ of transverse braces $D^4$. Similar bearings $b^{20}$ are arranged for supporting the shaft $b^{12}$, to which the segments $b^{10}$ and $b^{11}$ are applied. These bearings and the T-shaped braces $D^4$ are shown in detail in Fig. 22. The blocks D are arranged parallel to and close to the standards A', said blocks serving to press the blanks against the standards A' and hold the same rigidly in position while the folding of the edges is accomplished. The edge-folding devices are operated like the feeding devices in alternate manner—that is to say, while a blank is dropped between the standards and blocks at one side the edges of the blank at the other side are folded by the folding devices. When the folding of the edges of this blank is completed, the blocks are pressed over against the blank just dropped from the receiver and the edges of the same folded by the folding-plates at the other side. The blocks D receive a reciprocating motion between the standards A', which motion is imparted to them by means of the lateral cam-arms $D^2$ $D^3$, which are applied, respectively, to the upright shafts $b^{18}$ and $b^{12}$, and which are provided at their outer ends with cam-shaped faces that engage projections or toes $d^2$ $d^3$, attached to the inner faces of the blocks D. The blocks D are provided at their ends with flanges $d^4$, which lap over the T-shaped heads of the fixed supporting-braces $D^4$, (shown in Figs. $22^a$ and 18,) said flanges serving to guide the blocks in their laterally-reciprocating motion. The blocks D are further provided with guide-pins $d^5$, that pass through openings in the heads of the braces $D^4$, spiral springs $d^6$ being interposed between said heads and collars $d^7$ on the ends of said shanks, so that the blocks D are pressed tightly against the heads of the braces $D^4$ until they are moved away from the same by the cam-arms $D^2$ for holding the blank tightly against the faces of the standards A'. Oscillating motion is imparted to the cam-arms $D^2$ D³ by a gear-transmission, which is shown clearly in Figs. 17 and 18, and which consists of a segment $d^8$, attached to the upper end of the shaft $b^{14}$, and which is oscillated by the folding pusher D' on the shaft $b^{14}$. The segment $d^8$ meshes with a segment $d^9$ on the shaft $b^{12}$, while a second segment $d^{10}$ at the lower end of the same shaft meshes with the segment $d^{11}$ on an intermediate short shaft $d^{12}$, which is secured into a slot of the main plate A, the hub of the segment $d^{11}$ turning loosely on said fixed shaft $d^{12}$. A second segment $d^{13}$ is made integral with the segment $d^{11}$ and placed in mesh with a segment $d^{14}$, that is attached to the lower end of the shaft $b^{18}$, by which a pair of press-blocks is operated. In this manner the oscillating motion of the pusher D', attached to the shaft $b^{14}$, transmits not alone oscillating motion to the arms D² D³ of both pairs of press-blocks D, but also the required motion to the blank-feeding devices by the gear-transmission described in connection with said feed-devices. The second pusher D' is loosely placed by its hub on the shaft $b^{18}$, so as to swing on said shaft without interfering therewith. While the blank is dropped from the receiver R along the faces of the standards A', it is guided at both ends by means of gages e, which extend at right angles to the standards, as shown in Fig. 18. These gages are guided in recesses e' of sleeves $e^4$ of the standards A' and attached to slide-blocks $e^2$, the shanks $e^3$ of which are guided in the sleeves $e^4$ of the standards A'. The slide-blocks $e^2$ are provided with projecting noses $e^5$, which are engaged by cams $e^6$, one set of noses being made integral with the oscillating pusher D' at one end of the machine, while the other set of noses $e^5$ extends laterally from the pusher D' at the opposite end of the machine, as shown in Fig. 18. Spiral springs $e^7$ are interposed between the noses $e^5$ and fixed lugs $e^8$ of the standards A', so as to return the gages whenever the pressure of the cams $e^6$ on the noses $e^5$ of the slide-blocks $e^2$ of the gages e is relaxed. When the gages e are in forward position and not acted upon by the cams $e^6$, they serve to hold the blank accurately in vertical position between the standards A' and blocks D, ready for the action of the fixed and oscillating edge-folding plates d d'. As soon as the edge-folding plates d' are oscillated so as to approach the edges over the fixed plates d the gages e are pushed back by the action of the cams $e^6$ on the noses $e^5$, so that the movable plates d' can engage the edges of the blanks and fold them over the fixed plates d, as shown clearly in Fig. 18. In this figure the gages e are omitted for the sake of clearness at one side of the same, so as to show clearly the folded edges of the blank. When the blanks are dropped alongside of the faces of the standards A', ready for the folding action, they are supported at the ends on the heads of screw-bolts f, which are adjusted in longitudinal slots a' of the main plate A, said screw-bolts being located outside of the fixed plates d, so that the edges of the blank when folded, clear said heads and permit the dropping of the blank through the slots a', below the main plate A, into the path of the longitudinally-reciprocating formers by which they are moved up to the shaping-horns. The beveled folding-plates d' at the ends of the oscillating pushers D' are secured into recesses of the same by means of suitable fastening-screws, as shown clearly in Figs. 18, 20, and 21, in which figures also the cam $e^6$, for operating the gage e, is clearly shown. The pushers D' are oscillated by cams S on the shaft S', straps S² on said cams, and intermediate connecting-rods $s^2$, guided in boxes $s^3$, as shown in Figs. 1 and 2.

*The body-forming device.*—As soon as the folding of the edges of the blank is completed the blank is dropped through the longitudinal slots a' of the main plate A onto horizontal ways A², which are supported below the main plate A by and made integral with parallel hanger-plates A³, that are attached to the under side of the main plate A, as shown in Figs. 1 and 2. The blank is supported in vertical position by the inner ends of two spring-dogs g g, which are pivoted to ears g' on the outside of said hanger-plates and extended through slots $g^2$ in the same, so as to project at the inner side of the hanger-plates, as shown clearly in Figs. 22 and 23. The horizontal ways A² and the spring-dogs serve to support the blank in vertical position on the auxiliary plates A², ready to be moved forward by a horizontally-reciprocating former G, which is guided on auxiliary ways A⁴, supported below the ways A² of the hanger-plates A³. The former G is provided with a semicircular recess and with laterally-extending arms G', which are nearly of the width of the blank, and which are attached to the sides of the former G. The former G and the lateral arms G' serve to move the blank forward by first pressing it past the spring-dogs. The arms G' serve to prevent the bending of the blank, which would take place if the former only would act on the middle part of the same. By the forward motion of the former G the blank is moved between the angular hanger-plates A³ up to a shaping-horn H, which is supported in vertical position at the end of the stroke of the former G, and the diameter of which corresponds to the size of the can-body to be produced. The semicircular recess in the former G corresponds to one half of the circumference of the horn H, and serves to lap the blank around the one half of the circumference of the horn and bend it into U shape, as indicated in Fig. 24. The former G is spring-cushioned, so as to prevent its too violent pushing action on the horn H by means of a spring-actuated cushioning-pin $g^3$, which is guided in a longitudinal socket $g^4$ at the base of the former G, as shown clearly in Figs. 8 and 9. Two formers G—one for each edge-folding device—are arranged in connection with two horns H and connected by a screw-rod $g^6$, which passes through lugs $g^5$ of the base of the formers, and is attached to said perforated lugs by means of screw-nuts $g^7$, one at each side of the lugs, as shown clearly in Figs. 8 and 9. Horizontally-reciprocating motion is imparted to the formers G from the cam-shaft S', that is supported on the main plate A by means of a cam $g^8$, which engages anti-friction rollers $g^9$ of a fulcrumed lever $g^{10}$, which lever is connected by a pivot-link $g^{11}$ with an elbow-lever $g^{12}$, that is supported in bearings of the hangers $g^{13}$. The elbow-lever $g^{12}$ is provided at the lower end with a toothed segment $g^{13}$, which meshes with a pinion $g^{15}$, the shaft of which is supported in bearings of the bed-plate $A^4$ of the machine. To the shaft of the pinion $g^{15}$ is applied a toothed segment $g^{16}$, which meshes with a rack $g^{17}$, applied to the under sides of the base-plates of the formers G, as shown in Figs. 1, 7, and 8. By the cam, lever, and gear transmission described the formers G are reciprocated so as to move alternately the edge-folded blanks, which are dropped by gravity from the edge-folding devices onto the horns H, which are located near the ends of the machine, as shown clearly in Figs. 1, 23, and 24. In place of the transmitting mechanism described any other mechanism may be used by which reciprocating motion is imparted to the formers, care being taken that the motion of the same is so timed that they alternately feed the blanks as they are released and dropped from the edge-folding devices toward one horn or the other. The construction of the horn is shown in detail in Figs. 4, 5, 6, and $6^a$, and its connection with the main plate A in Figs. 15 and 16. It is composed of two sections $h\ h'$, of which the smaller section $h'$ is guided by a dovetailed groove on a dovetailed tongue of the larger section $h$. The dovetailed connection between the two sections $h\ h'$ has a longitudinal inclination, so that when the smaller section $h'$ is caused to slide back on the larger section $h$ the size of the horn is diminished, while when it is moved downward on the larger section until the end of the smaller section is in line with the end of the larger section the normal size of the horn is established. The larger section $h$ of the horn is rigidly supported on the main plate A by means of a shoe H', (shown in Fig. 16,) which engages the upper oblong shank or end $h^2$ of the larger section $h$) and is secured thereto by a transverse screw-bolt $h^3$ and a clamp-screw $h^7$. The shoe H' is adjustable on the main plate A by means of a set-screw $h^4$, that turns in a lug $h^5$ at the top of the main plate A, as shown clearly in Figs. 1, 15, and 16. The base-plate $H^2$ of the shoe H' is bolted to the main plate A by bolts $h^6\ h^6$, said bolts being passed through elongated openings, so as to permit the adjustment of the shoe H' on the main plate A. The larger section $h$ of the horn is further provided with a longitudinal groove $h^\times$, which serves for pressing in the interlocking edges of the blank after the can-body is formed on the horn. The smaller section $h'$ of the horn H is moved vertically along the larger section $h$ by means of a cam $h^8$, which is keyed to the upper shaft S', as shown in Fig. 1, and which engages an anti-friction roller $h^9$, that is applied to a frame $h^{10}$, which is guided in ways $h^{11}$, attached to the ceiling or other point of support. The lower end of the vertically-sliding frame $h^{10}$ is connected by a pivot-rod $h^{12}$ with a perforated lug $h^{13}$ at the upper end of the smaller section $h'$. The shape of the cam $h^8$ and the different positions into which the smaller sliding section $h'$ of the horn H is moved by the cams are clearly shown in Figs. 4, 5, and 6. When the blank is placed around the horn H by the former G, the smaller section $h'$ is in the position shown in Fig. 4—namely, in the same position in which it was placed when the last-completed can-body was dropped from the horn. While in this position the blank is placed around the horn first by the former and then by the oscillating blank-closing jaws, which engage the folded edges of the blank and cause them to overlap each other, so that the folded edges interlock and can be closed in the longitudinal recess $h^\times$ of the horn H by the action of a vertical nipping-hammer L, which is located sidewise of and in line with the center of the horn, as shown clearly in Fig. 3. To permit the folded edges to overlap each other, it is necessary that the size of the horn be diminished, which is accomplished by causing the smaller section $h'$ to be moved up still more on the larger section $h$ into the position shown in Fig. 5. While the sections are in this position the blank-closing jaws I are applied to the ends of the blank, so that the folded edges are enabled to overlap, as shown clearly in Fig. 3. As soon as the edges overlap sufficiently to permit them to interlock with each other the smaller section $h'$ of the horn is moved downwardly into its third position, as shown in Fig. 6, by which the full size required by the can-body is imparted to the horn, and thereby the folded edges are drawn against each other. In this position the nipping-hammer L strikes a quick blow on the interlocking edges and forces them into the longitudinal groove $h^\times$ of the larger section of the horn H, so as to produce the smooth longitudinal seam of the can-body. As soon as the seam of the can-body is completed, the smaller section $h'$ is moved up again into the position shown in Fig. 4, so that the size of the horn is diminished, and thereby the can-body enabled to drop off vertically from the horn onto a suitable conveyer-belt, (not shown in the drawings,) by which it is conducted off for further treatment. The blank-closing jaws I are fulcrumed to fixed pivot-pins $i$, which are attached to a suitable supporting-plate below the main plate A. The blank-closing jaws I are made of two curved parts—a longer part $i'$ and another short part $i^2$, which latter is hinged to the longer part and connected thereto by an adjustable pivot-rod $i^3$, as shown clearly in Fig. 3, by which the outer ends of the jaws can be accurately adjusted relatively to the ends of the blank. The outer end $i^2$ of each jaw I is provided with a socket $i^4$, in which is guided a spring-actuated presser-cheek $i^5$, that is provided with an arc-shaped edge corresponding to the circumference of the horn H at the point at which the presser-cheek is applied to the same. The presser-cheeks $i^5$ serve to press the ends of the blank in connection with the ends $i^2$ of the jaws around the horn as to produce the overlapping of the ends of the blank. The spring-cushioning of the presser-cheeks is necessary for the purpose of providing for the enlargement of the horn when the same assumes the position shown in Fig. 6, and imparts thereby the proper shape to the can-body. The blank-closing jaws I are operated at the proper time by means of a vertically-reciprocating wedge-piece I', which engages rearwardly-extending arms $i^7$ of the jaws I, and which is applied to the lower end of a spindle $i^6$, that is guided in the main plate A, as shown clearly in Fig. 1, said spindle being lifted by a spiral spring $i^8$ as soon as the pressure of the actuating-cam $i^9$ on the cam-shaft S' on an anti-friction roller $i^{10}$ at the upper end of a spindle $i^6$ is relaxed. The wedge-piece I' enters between the rearwardly-extending arms $i^7$ of the blank-closing jaws I, which arms are preferably provided with anti-friction rollers, and serves to close the jaws I by their downward motion against the tension of the springs $i^{11}$, which are attached to the larger parts $i'$ of the jaws and to fixed arms of the supporting main plate A, as shown clearly at the left-hand side of Fig. 1. As soon as the wedge-piece I' is raised by its spring $i^8$ and the receiving motion of its cam $i^9$ the jaws are returned into open position again by their springs $i^{11}$, as shown in Fig. 2. The nipping-hammer L is pivoted to the lower end of a lever $l$, which is fulcrumed to a supporting-standard $l'$, attached to the top surface of the main plate A, as shown in Fig. 1. The upper end of the lever $l$ is provided with an anti-friction roller $l^2$, that is acted upon by a wave-cam $l^3$, attached to the upper shaft S'. The nipping-hammer L is centrally pivoted to the lower end of the fulcrumed lever $l$ and engaged by a steadying-pin $l^4$ at the upper end and a spiral spring $l^5$ at the lower end, so that it can give sufficiently when the lower end presses on the blank until its longitudinal center tongue $l^x$ is parallel to the horn and in a position to tightly close the seam of the can-body and press the interlocking edges of the blank into the longitudinal groove $h^x$ of the horn. The wave-cam $l^3$, by which motion is imparted to the hammer, is provided with two shoulders or offsets, so that the nipping action of the hammer is produced by two successive steps, the first offset serving to apply the tongue of the nipping-hammer to the interlocking edges of the blank as soon as the blank-closing jaws cause them to overlap each other, while the second offset imparts a still further forward motion to the nipping-hammer, so that the final pressure is given to the folded interlocking edges and the seam produced thereby.

The mechanism by which power is transmitted from the upper and lower cam-shafts to the working parts of the machine may be varied from those shown, as I do not desire to confine myself to the transmitting mechanism shown in the drawings.

*Operation.*—The operation of my machine for making the seams of sheet-metal cans is as follows: The blanks are inserted in upright position into the receivers R and retained by the felt-covered drop-plates $b$. The machine is then started, and thereby one plate after the other fed by the magnets of the reciprocating feeding device from the receivers to the edge-folding devices below the same. This is accomplished by the abutting of the blanks against the inwardly-projecting flanges of the blank-receivers R, by which the blanks are separated from the magnets so as to slide by gravity along the flanges $b^2$ and the inclined inner edges of the bottoms of the blank-receivers R along the inner faces of the supporting-standards A' until arrested by the stop-nuts $f$. In this position the blanks are clamped by the action of the blocks D, and the edges of the same bent in opposite direction by the beveled plates or dies of the oscillating heads B'. Before the folding of the edges takes place the blanks are retained in position by transverse gages, which are pushed out of the way for the action of the folding dies or plates. As soon as the edges are folded the blanks are dropped by gravity through the slots of the main plate of the machine into the path of the horizontally-reciprocating formers, the blanks being retained by spring-fingers before they are acted upon by the formers. The formers move the blank forward and lap it around a vertically-supported horn, ready for the action of the blank-closing jaws and the reciprocating nipping-hammer, which latter forms the seam in connection with the longitudinal groove of the horn. By the sliding action of one section of the horn the size of the same is increased and diminished, so that the horn will hold the can-body firmly in position for closing and then drop the completed can-body to be conducted off for further treatment.

The advantages of my improved machine for seaming sheet-metal can-bodies are, first, that by constructing the machine as a double machine two can-bodies can be made with each rotation of the actuating cam-shafts and within the same time in which heretofore one can could be made; secondly, that the blanks, instead of being fed to the machine by hand, are supplied by an automatic arrangement, so that considerable time and labor are saved in operating the machine, while the feeding of the blanks is made more reliable, provided that care be taken to keep the blank-receivers constantly filled, which is readily accomplished by replacing a set of new blanks before the last blank has been fed from the receivers; thirdly, that by passing the blanks in vertical position through the machine they are fed by gravity from the feeding devices to the edge-folding devices and from the latter to the formers and finally dropped by gravity from the horns; fourthly, that the edge-folding devices are made of a very reliable and comparatively simple construction, which is one of the requirements of such a machine; fifthly, that cans of round, square, or other cross-section can be made by simply inserting horns of corresponding shape, and, lastly, that within certain limits can-bodies of varying sizes can be made on the machine as the different actuating parts are made adjustable and interchangeable.

Having thus described my invention, I claim as new and desire to secure by Letters Patent—

1. The combination of a blank-receiver open at the inside, with reciprocating T-shaped feed-arms having magnets at their ends by which the blanks are attracted and moved from one side of the receiver to the other, substantially as set forth.

2. The combination of a blank-receiver having flanges at its inner end and inwardly-projecting spring-dogs at its side walls, with laterally-reciprocating feed-arms having magnets at the ends, substantially as set forth.

3. The combination, with a blank-receiver having recessed flanges at its inner end and spring-dogs near said flanges, of laterally-reciprocating feed-arms having permanent magnets at the ends, said magnets passing the recesses of the flanges during the forward and backward motions of the feed-arms, substantially as set forth.

4. The combination of a blank-receiver open at the inner end and having inwardly-bent flanges provided with recesses and spring-dogs near said flanges, with spring-cushioned feed-arms having magnets at the outer ends, and transmitting-gearing for imparting reciprocating motion to said feed-arms, substantially as set forth.

5. The combination of a blank-receiver with recessed inwardly-bent flanges at the inner ends, spring-dogs back of said flanges, and a bottom having a beveled inner edge, with reciprocating and spring-cushioned feed-arms having magnets at their outer ends, substantially as set forth.

6. The combination, with a blank-receiver and reciprocating feed-arms having magnets at the ends, of a hinged top plate extending over the receiver and provided with a friction-surface at its under side for holding the upper ends of the blanks, substantially as set forth.

7. The combination of a blank-receiver, reciprocating feed-arms having magnets for feeding the blanks, and edge-folding devices located below said feed-devices, substantially as set forth.

8. The combination of a blank-receiver, reciprocating feed-arms having magnets, upright standards for supporting said receiver, and fixed and oscillating edge-folding dies arranged at opposite ends of the standards, substantially as set forth.

9. The combination of a main plate having slots and stops in said slots, fixed and oscillating edge-folding dies, gages for the blank, and means for supporting the blank in vertical position for the action of the dies, substantially as set forth.

10. The combination of fixed and oscillating edge-folding dies with sliding and spring-actuated gages, cams for moving said gages out of the way of the oscillating die, and means for holding the blank in vertical position for the action of said dies, substantially as set forth.

11. The combination of a main plate having a slot, stops in said slot, upright standards alongside of said slot, sliding and spring-actuated gages at the outer ends of the standards, fixed and oscillating edge-folding dies, and intermittently-actuated clamping-blocks for holding the blank between the blocks and standards for the folding action of the dies, substantially as set forth.

12. The combination of upright guide-standards, gages at the outer ends of said standards, fixed and oscillating edge-folding dies, spring-actuated clamping-blocks adjoining said standards, and mechanism for intermittently pressing said blocks against the standards for holding the blank in position for action of the dies, substantially as set forth.

13. The combination of upright guide-standards for the blank, fixed and oscillating edge-folding dies, fixed braces, spring-actuated blocks guided on the heads of said braces, and oscillating cam-arms for intermittently pressing the blocks against the standards, substantially as set forth.

14. The combination of upright guide-standards, a supporting main plate having a longitudinal slot in line with the faces of said standards, adjustable stops in said slot, laterally-guided and spring-actuated gages for retaining the blank, fixed and oscillating folding-dies, spring-cushioned blocks for holding the blank in position on the standards for the action of the folding-dies, means for moving the gages out of the way, oscillating cam-arms engaging projections of said blocks, and means for oscillating said cam-arms, substantially as set forth.

15. The combination of a slotted main plate, edge-folding devices supported on said plate, angular hanger-plates below said main plate, spring-dogs supported by said hanger-plates, and a reciprocating former, also below said main plate, for moving the blank dropped from the edge-folding devices to the shaping-horn, substantially as set forth.

16. The combination of vertical blank-guiding hanger-plates having inwardly-bent lower ends, spring-dogs projecting through slots of the same, a reciprocating former guided in ways below the hanger-plates, said former having a central recess and laterally-extending arms, and a vertical blank-shaping horn, substantially as set forth.

17. The combination of a blank-shaping horn, a former for bending the blank around said horn, oscillating blank-closing jaws having spring-cushioned presser-cheeks near the front ends of the jaws, and mechanism for closing the jaws at the proper time, substantially as set forth.

18. The combination of a blank-shaping horn formed of a fixed larger section and a smaller movable section, a cam mechanism for moving the smaller section, oscillating blank-closing jaws having spring-cushioned presser-cheeks near the front ends of the jaws, and mechanism for closing the jaws at the proper time, substantially as set forth.

19. The combination of a blank-shaping horn having a longitudinal seaming-groove, oscillating blank-closing jaws having spring-cushioned presser-cheeks near the front ends of the jaws, mechanism for closing the jaws at the proper time, and a reciprocating nipping-hammer having a tongue fitting into the groove of the horn, substantially as set forth.

20. The combination of a reciprocating former, a fixed horn, oscillating blank-closing jaws having spring-cushioned presser-cheeks near the front ends of said jaws, mechanism for closing the jaws at the proper time, and a reciprocating nipping-hammer located between said jaws in line with the former and horn, substantially as set forth.

In testimony that I claim the foregoing as my invention I have signed my name in presence of two subscribing witnesses.

RICHARD STEEGMÜLLER.

Witnesses:
PAUL GOEPEL,
JOHN A. STRALEY.